(12) United States Patent
Sauther

(10) Patent No.: US 10,305,884 B2
(45) Date of Patent: May 28, 2019

(54) SECURE IDENTIFICATION OF INTERNET HOTSPOTS FOR THE PASSAGE OF SENSITIVE INFORMATION

(71) Applicant: Mark Sauther, Pleasantville, NY (US)

(72) Inventor: Mark Sauther, Pleasantville, NY (US)

(*) Notice: Subject to any disclaimer, the term of this patent is extended or adjusted under 35 U.S.C. 154(b) by 0 days.

(21) Appl. No.: 14/098,616

(22) Filed: Dec. 6, 2013

(65) Prior Publication Data

US 2014/0165180 A1 Jun. 12, 2014

Related U.S. Application Data

(60) Provisional application No. 61/734,219, filed on Dec. 6, 2012.

(51) Int. Cl.
*H04L 29/06* (2006.01)
*H04W 12/06* (2009.01)

(52) U.S. Cl.
CPC ......... *H04L 63/0823* (2013.01); *H04W 12/06* (2013.01); *H04L 63/0869* (2013.01)

(58) Field of Classification Search
CPC . H04L 63/0823; H04L 63/0869; H04L 29/06; H04L 9/00; H04W 12/06
USPC .................................. 726/2–21, 22; 713/156
See application file for complete search history.

(56) References Cited

U.S. PATENT DOCUMENTS

| | | | | |
|---|---|---|---|---|
| 2010/0031029 A1* | 2/2010 | Ilyadis | ............... | H04L 9/3271 713/156 |
| 2010/0100951 A1* | 4/2010 | Kutt | ................. | G06Q 30/0601 726/9 |
| 2010/0263022 A1* | 10/2010 | Wynn | ................. | H04W 12/06 726/3 |
| 2013/0007850 A1* | 1/2013 | Lambert | ....................... | 726/4 |
| 2013/0232561 A1* | 9/2013 | Gupta | ............................. | 726/5 |
| 2013/0263263 A1* | 10/2013 | Narkolayev | .......... | G06F 21/51 726/22 |
| 2013/0347073 A1* | 12/2013 | Bryksa | ................. | H04L 63/105 726/4 |

* cited by examiner

*Primary Examiner* — Ashokkumar B Patel
*Assistant Examiner* — Quazi Farooqui
(74) *Attorney, Agent, or Firm* — Pryor Cashman LLP

(57) ABSTRACT

A system and method for verifying the identity of internet hotspots, comprising a user device having a processor, memory, and radio transceiver, an internet hotspot, a wireless access point, coupled to the radio transceiver of the user device and the internet hotspot, and a program stored in the memory and adapted to run on the processor of the user device, wherein the program is configured to identify a mobile wireless access point for connection by a user, connect a user to the wireless access point through a login request, query an initial probe request for the identity of the authenticating source of the wireless access point, perform a security check on the wireless access point, verify the validity and authenticity of the wireless access point to prevent transmission of information associated with the user device, and either permit or drop the connection to the wireless access point upon verification.

20 Claims, 3 Drawing Sheets

SECURE IDENTIFICATION OF INTERNET HOTSPOTS FOR THE PASSAGE OF SENSITIVE INFORMATION

RELATED INVENTIONS

This application claims priority to U.S. Provisional Application No. 61/734,219, filed Dec. 6, 2012, the disclosure and teachings of which are incorporated by reference herein.

FIELD OF THE INVENTION

The present invention relates to a system and method for identifying secure internet hotspots for the passage of secure user information.

BACKGROUND OF THE INVENTION

More and more, individuals are utilizing wireless internet by means of their mobile phones, PDAs, laptops, or other portable devices. With mobile phones, users are able to use the wireless 3G or 4G connection within range of their network. However, when it comes to connecting laptop computers or other electronic devices, users must connect to WiFi where available. When not at home or another specific location with an internet connection, users often look for internet cafes or other places that allow use of free wireless internet. However, the issue for users becomes not knowing the authenticity or security of the available WiFi connection.

Thus, with the explosion of available open complementary hotspots, businesses and individuals have begun to offload their internet traffic from pay mobile broadband companies. They use these open hotspots in addition to their mobile data plans in order to reduce costs and improve end-user experience. Security has become a concern with an open complementary hotspot, as the prevalence of threats arises to maliciously capture users' data and credential information.

Two of the largest threats to data can include a "Twin Attack," where a second access point ("AP") broadcasts with the same service set identifier ("SSID") as the one the user is looking to connect to, or a "Man in the Middle attack," where a computer can act like the hosting AP and broadcast the SSID and transport the traffic to the desired endpoint. This allows an attacker to pose as the desired AP and inspect the packets being passed to the desired endpoint.

Due to the ease at which an attacker sharing an unsecure network broadcast can steal data and other personal information being passed thereon, there is a need to identify secure internet hotspots to ensure protection of information. Thus, the present invention includes methods of securely identifying these hotspots before sensitive information is passed. The goal of the present invention is to help ensure the safety of a user's credentials, while also providing assurances to the user that the hotspot to which they are connecting is in fact the one they think it is.

The present invention discloses a roaming implementation for internet service providers, which is adapted to verify to an entity that is connected to a network that it is indeed the desired WiFi Access Point to which the user desired to connect. The present invention therefore presents a system and method that allows users to roam between wireless internet service providers, in a fashion similar to that used to allow cellphone users to roam between carriers, and aims to solve the problem of vulnerable passage of secure information by taking an extra step of verifying the AP before any credentials are passed and continue to verify this AP every time after a connection occurs. These extra measures aim to ensure that the user's credentials and device information are not passed to a malicious entity or anyone not intended or desired to receive such information and that at any point when a reconnection occurs, the validity of the network is verified.

The present invention discloses a system and method to preferably expand upon the methods of how a "Client" would establish a connection to an AP "Hotspot" and perform authentication. The present invention is not intended to limit how a client would identify or verify the true identity of the AP, but presents an improvement and alternative method to such verification of the hotspot's identity.

In a preferred embodiment of the present invention, a client or user can connect to an AP from a device having a processor, a memory, and a radio transceiver, and perform an initial probe request. Upon completion of the probe request, a URL will preferably be returned that the client can use to probe for further information about the authenticating source. Upon retrieval of this authenticating information, the client can verify the data retrieved with its internal source and then either allow the authentication to continue or drop the connection with the AP. This protects the user from passing their credentials to an unknown source and also protects them from passing traffic on a compromised network.

SUMMARY OF THE INVENTION

The present invention discloses a system and method for verifying the identity of internet hotspots, comprising a user device having a processor, memory, and radio transceiver, an internet hotspot, a wireless access point, coupled to the radio transceiver of the user device and the internet hotspot, and a program stored in the memory and adapted to run on the processor of the user device, wherein the program is configured to identify a mobile wireless access point for connection by a user, connect a user to the wireless access point through a login request, query an initial probe request for the identity of the authenticating source of the wireless access point, perform a security check on the wireless access point, verify the validity and authenticity of the wireless access point to prevent transmission of information associated with the user device, and either permit or drop the connection to the wireless access point upon verification.

DESCRIPTION OF THE PRIOR ART

To the Applicant's knowledge, no prior art exists which presents a system and method for verifying internet hotspots prior to the transmission of confidential user information to ensure protection of the same. Thus, a there exists a need to verify the validity of an authenticating source and perform a security check on the authenticating source for verification of the identify, to either permit or drop the connection to the wireless access point upon verification.

BRIEF DESCRIPTION OF THE INVENTION

DETAILED DESCRIPTION OF THE INVENTION AND PREFERRED EMBODIMENT

Description will now be given of the invention with reference to the attached FIGS. 1-3. It should be understood that these figures are exemplary in nature and in no way serve to limit the scope of the invention as the invention will be defined by the claims, as interpreted by the Courts in an issued US patent.

Figure 1:
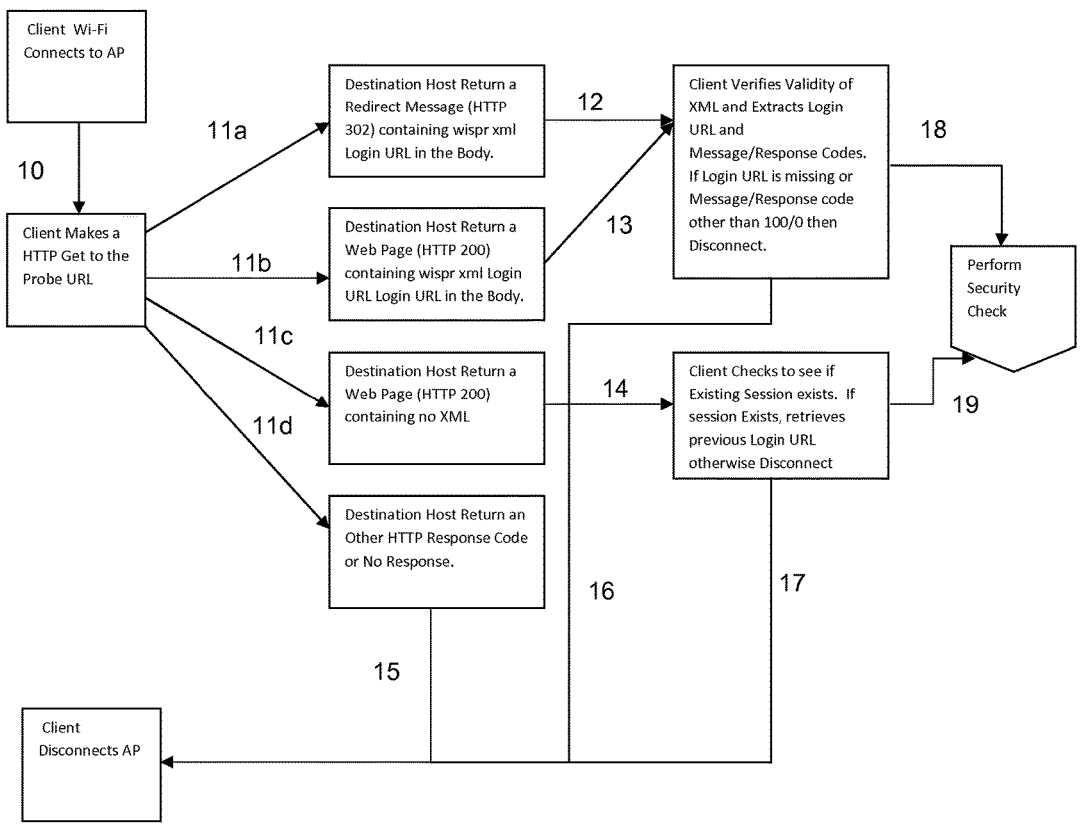
FIG. 1 is a flowchart disclosing the method of identifying secure internet hotspots disclosed by the present invention.
Figure 2:
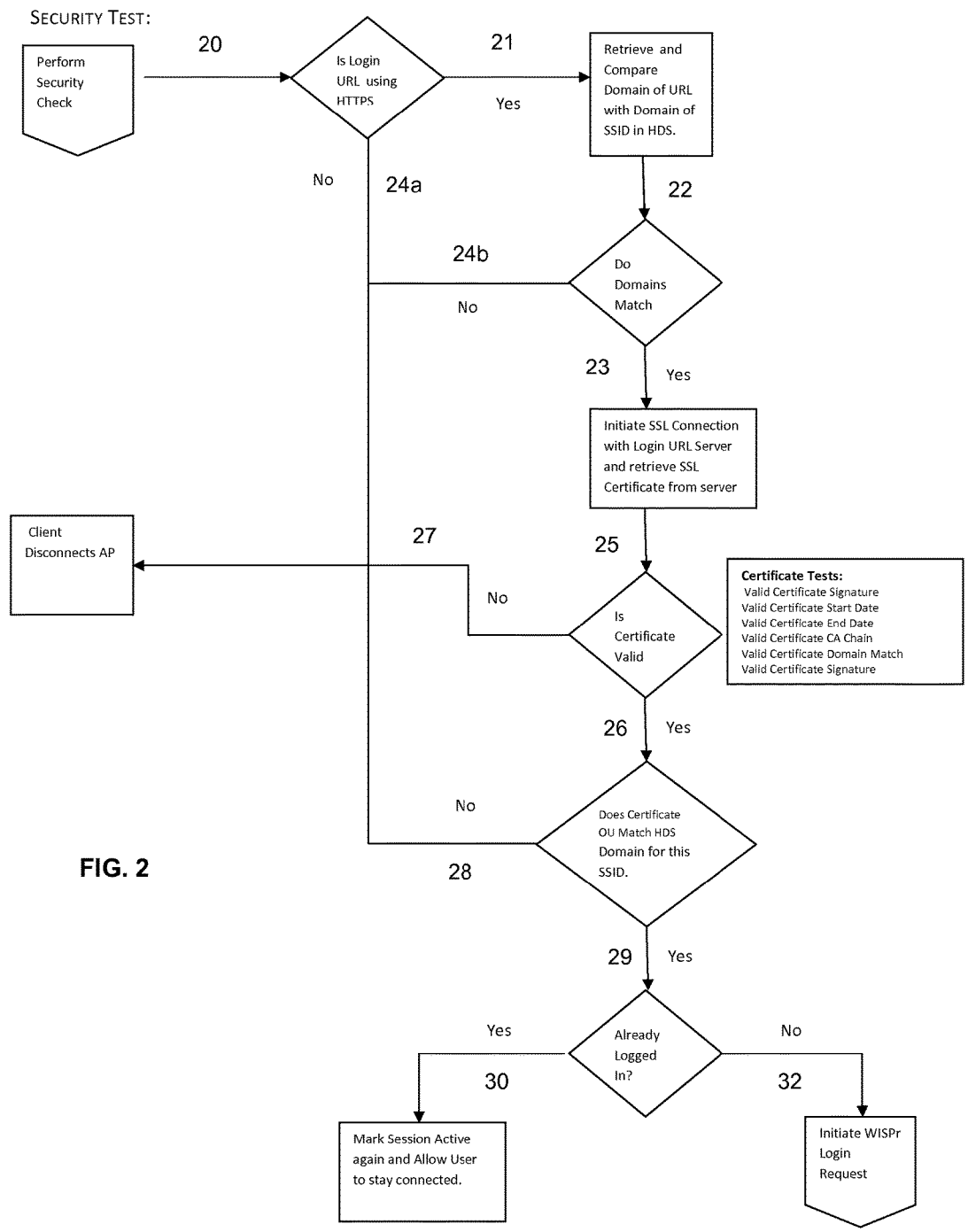
FIG. 2 is a flowchart showing the method for conducting a security test as shown in the final step of FIG. 1.

FIG. 1 is a flowchart showing the process by which a client attempts to log onto a hotspot to ensure the security and authenticity thereof. In step 10, a client uses WiFi to connect to an access point. Once connected to an access point, the client can probe the URL destination host to ensure its authenticity and safety in steps 11a-d. The destination host can return a redirect message containing the login URL in step 12, return a web page containing the login URL in step 13, and return a webpage containing no XML in step 14, or no response or other response in step 15. If the destination host returns a redirect message or web page, as seen in steps 12 and 13, and provides a login URL, the client verifies the validity of the XML and extracts login URL codes, as seen in step 18. If the destination host returns a web page containing no XML, the client can check to see if an existing session exists to retrieve the previous login URL, as in step 19. In either of these cases, the present invention can then perform a security check. If, after the destination host returns a webpage containing no XML, and no previous existing session is deemed to exist, the client can disconnect from the access point, as in step 17, as it is not deemed secure. This can also occur where the destination host returns no response, as in step 15, or if the user cannot verify the validity of the XML and extract the login code, as in step 16.

When the user has reached the point to perform a security check, he can do so in step 20. The method for performing the security check can be seen in FIG. 2. The client can inquire as to whether the login URL is using a secure communications protocol, such as HTTPS, in step 21. If the login URL is secure, the user can retrieve and compare the domain of the URL with the domain of a SSID, as seen in step 22. If the domains match, in step 23, the client can initiate a connection with the login URL and receive a certificate of validity from the server, as seen in step 25. If the certificate is valid, in step 26, the user can determine whether the certificate matches the domain for the SSID, in step 29. If a user is already logged in, the user can stay connected, as in step 30. If the user is not already logged in, in step 32, he can initiate a login request. If at any time during the security check one of the requirements is not met, the client will disconnect from the access point.

Figure 3:
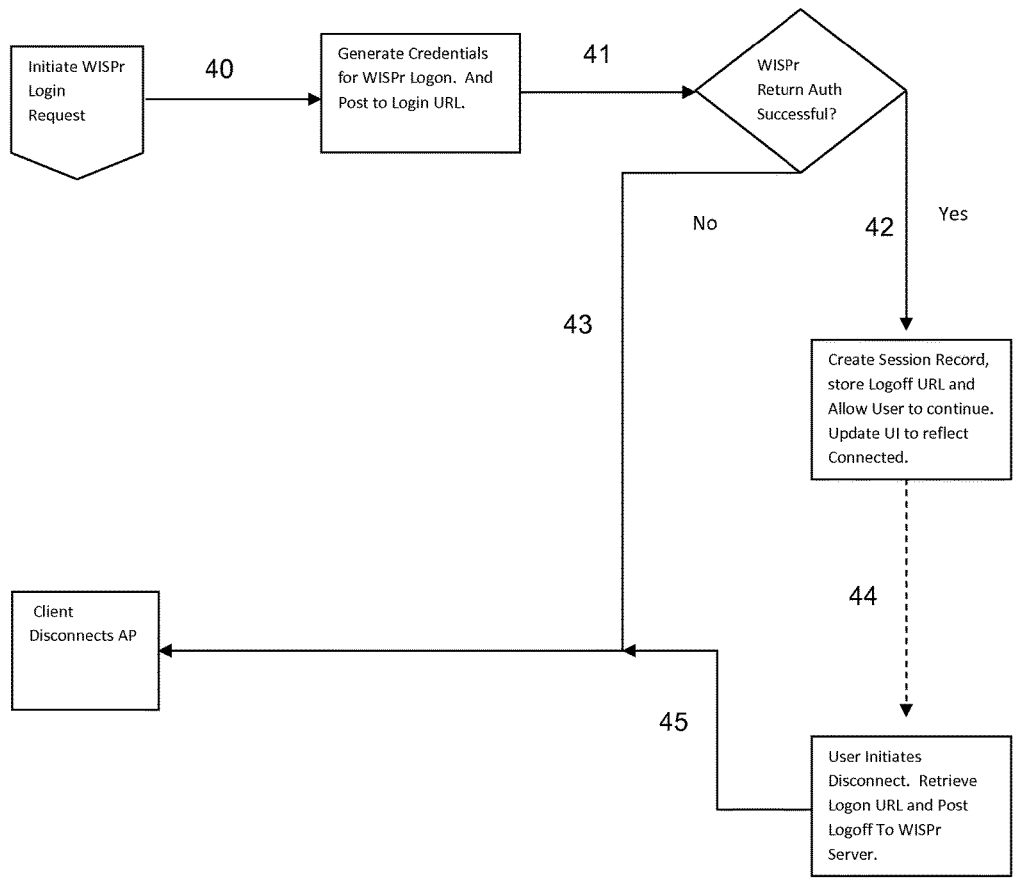
FIG. 3 is a flowchart showing the method for logging in to a secure internet hotspot as shown in the final step of FIG. 2.

The method for initiating a secure login can be seen in FIG. 3. When a login request is initiated, in step 40, credentials can be generated for the login in step 41. If the authentication return is successful, in step 42, the server can create a session record and allow a user to proceed, as in step 44. Once the user has completed his action, he can initiate a log off of the server, as seen in step 45. Again, if at any time during the log in process the authentication requirements are not met, the client will disconnect from the access point.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed:

1. A system for verifying the identity of internet hotspots, comprising:
   a user device having a processor, a memory, and a radio transceiver;
   an internet hotspot;
   a wireless access point, coupled to said radio transceiver of said user device and said internet hotspot; and
   a program stored in the memory of said user device and adapted to run on said processor of said user device, wherein said program is configured to:
     perform a security check on said wireless access point, said security check including:
       comparing a domain of a URL with a domain of a service set identifier (SSID) of said wireless access point;
       retrieving an SSL certificate from a server, said SSL certificate having at least one identifiable item; and
       comparing said at least one identifiable item of said SSL certificate to at least one identifiable item of a certificate of said SSID of said wireless access point;
     verify a validity and authenticity of said wireless access point; and
     permit a connection to said wireless access point if said SSL certificate matches said certificate of said SSID of said wireless access point and an authentication is valid,
   wherein said at least one identifiable item of said SSL certificate includes one or more of a certificate signature, a certificate start date, a certificate end date, and a certificate authority chain.

2. A system as claimed in claim 1, wherein a user is connected to said wireless access point through a login request.

3. A system as claimed in claim 2, wherein said user device is adapted to disconnect from said wireless access point if said SSID of said wireless access point is not verified.

4. A system as claimed in claim 1, wherein said user device is further configured to drop the connection to said wireless access point if said at least one identifiable item of said SSL certificate does not match said at least one identifiable item of said certificate or if said URL domain does not match said domain of said SSID of said wireless access point.

5. A system as claimed in claim 1, wherein said user device is further configured to drop the connection to said wireless access point upon lack of verification of said validity or authenticity of said internet hotspot.

6. A system as claimed in claim 1, wherein said user device is further adapted to initiate an initial probe request for the identity of the SSID of said wireless access point, said initial probe request comprising receiving a web page response or message response from said SSID of said wireless access point.

7. A system as claimed in claim 5, wherein said user device is adapted to drop the connection to said wireless access point upon receipt of a web page containing no XML or upon receipt of no response.

8. A system as claimed in claim 5, wherein said initial probe request is further configured to allow an active user to remain connected to said hotspot.

9. A method for verifying the identity of internet hotspots, comprising:
   identifying a mobile wireless access point for connection by a user on a user device having a processor, a memory, and a radio transceiver;
   connecting a user to said wireless access point through a login request;
   initiating an initial probe request for an identity of a service set identifier (SSID) of said wireless access point including:
      receiving a web page response or message response from said SSID of said wireless access point;
      verifying a validity of said SSID of said wireless access point; and
      performing a security check on said SSID of said wireless access point for verification of said identity, comprising:
         comparing a domain of a URL with a domain of said SSID of said wireless access point;
         retrieving an SSL certificate from a server, said SSL certificate having at least one identifiable item;
         comparing said at least one identifiable item of said SSL certificate to at least one identifiable item of a certificate of said SSID of said wireless access point; and
         permitting a connection to said wireless access point if said SSL certificate matches said certificate of said SSID of said wireless access point and an authentication is valid,
         wherein said at least one identifiable item of said SSL certificate includes one or more of a certificate signature, a certificate start date, a certificate end date, and a certificate authority chain.

10. A method as claimed in claim 9, wherein said connecting step further includes disconnecting from said wireless access point if said SSID of said wireless access point is not verified.

11. A method as claimed in claim 9, wherein said initiating step further comprises allowing an active user to remain connected to said hotspot.

12. A method as claimed in claim 9, wherein said initiating step further comprises dropping the connection to said wireless access point upon receipt of a web page containing no XML or upon receipt of no response.

13. A method as claimed in claim 9, wherein said performing step further comprises dropping the connection to said wireless access point if said at least one identifiable item of said SSL certificate does not match said at least one identifiable item of said certificate or if said URL domain does not match said domain of said SSID of said wireless access point.

14. A method as claimed in claim 9, wherein said security check further comprises dropping the connection to said wireless access point upon lack of verification of said validity or authenticity of said internet hotspot.

15. A method for verifying the identity of internet hotspots for connection by a user device having a processor, a memory, and a radio transceiver, comprising:
   connecting a wireless access point to the user device through a login request;
   receiving, by said wireless access point, an initial probe request from the user device for an identity of a service set identifier (SSID) of said wireless access point including:
      verifying a validity of said SSID of said wireless access point; and
      performing a security check on said SSID of said wireless access point for verification of said identify, comprising:
         comparing a domain of a URL with a domain of said SSID of said wireless access point;
         comparing at least one identifiable item of an SSL certificate to at least one identifiable item of a certificate of said SSID of said wireless access point; and
         permitting a connection to said wireless access point if said SSL certificate matches said certificate of said SSID of said wireless access point and an authentication is valid,
         wherein said at least one identifiable item of said SSL certificate includes one or more of a certificate signature, a certificate start date, a certificate end date, and a certificate authority chain.

16. A method as claimed in claim 15, wherein said connecting step further comprises allowing an active user to remain connected to said hotspot.

17. A method as claimed in claim 15, wherein said performing step further comprises dropping the connection to said wireless access point upon lack of verification of said validity or authenticity of said internet hotspot.

18. A method as claimed in claim 15, wherein said initiating step further comprises dropping the connection to said wireless access point upon receipt of a web page containing no XML or upon receipt of no response.

19. A method as claimed in claim 15, wherein said performing step further comprises dropping the connection to said wireless access point if said at least one identifiable item of said SSL certificate does not match said at least one identifiable item of said certificate or if said URL domain does not match said domain of said SSID of said wireless access point.

20. A method as claimed in claim 15, wherein said performing step further comprises dropping the connection to said wireless access point upon lack of verification of said validity or authenticity of said internet hotspot.

* * * * *